United States Patent
Nakayoshi et al.

(10) Patent No.: US 7,015,992 B2
(45) Date of Patent: *Mar. 21, 2006

(54) COLOR DISPLAY DEVICE (75) Inventors: Yoshiaki Nakayoshi, Ooamishirasato (JP); Kazuhiko Yanagawa, Mobara (JP)

(73) Assignee: HItachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/837,622

(22) Filed: May 4, 2004

(65) Prior Publication Data

US 2004/0201799 A1    Oct. 14, 2004

Related U.S. Application Data (63) Continuation of application No. 10/347,401, filed on Jan. 21, 2003, now Pat. No. 6,734,945.

(30) Foreign Application Priority Data

Jan. 22, 2002    (JP)    ............................. 2002-012739

(51) Int. Cl.
G02F 1/1335    (2006.01)
G02F 1/1339    (2006.01)

(52) U.S. Cl. ...................... 349/106; 349/155; 349/138
(58) Field of Classification Search ................ 349/106, 349/138, 153, 110, 155
See application file for complete search history.

(56) References Cited

U.S. PATENT DOCUMENTS

| 5,365,357 | A  | 11/1994 | Ohgawara et al. |
| 6,570,639 | B1 | 5/2003  | Manabe et al. |
| 6,654,084 | B1 | 11/2003 | Marukawa et al. |

Primary Examiner—Toan Ton
(74) Attorney, Agent, or Firm—Antonelli, Terry, Stout and Kraus, LLP.

(57) ABSTRACT

A color display device including a pair of substrates having a display portion and a peripheral portion. Gate signal lines and drain signal lines are formed on one substrate of the pair of substrates with a protective film being formed on the gate signal lines, the drain signal lines, and the one substrate including at least one of the peripheral portion and the display portion thereof. Color filters are formed on the other substrate and spacers are formed on the one substrate including the peripheral portion. At least two of the color filters are laminated in the peripheral portion, and a thickness of the protective film in the display portion is greater than a thickness of the protective film at a position of one of the spacers arranged in the peripheral portion.

17 Claims, 9 Drawing Sheets

COLOR DISPLAY DEVICE

CROSS REFERENCE TO RELATED APPLICATION

This is a continuation of U.S. application Ser. No. 10/347,401, filed Jan. 21, 2003, now U.S. Pat. No. 6,734,945, the subject matter of which is incorporated by reference herein.

BACKGROUND OF THE INVENTION

1. Field of the Invention

This invention relates to a liquid crystal display device. More particularly, the invention relates to a liquid crystal display device for color display, having color filters.

2. Description of the Related Art

A liquid crystal display device for color display includes color filters that exhibit colors respectively corresponding to pixel regions formed on a surface of one of substrates so arranged as to oppose each other through a liquid crystal, on the liquid crystal side.

A black matrix having an aperture at its center other than a slight peripheral portion of each pixel region is generally formed on the surface of one of the substrates described above on the liquid crystal side in such a fashion as to define each pixel region.

Therefore, color filters having the same color are formed in common to a group of pixels juxtaposed in a y direction, for example, of each pixel region which is arranged in a matrix form, and overlap with adjacent color filters of other colors on the black matrix.

In the liquid crystal display device having the construction described above, however, it has been desired to eliminate the necessity for forming the black matrix so as to further improve the aperture ratio.

Nonetheless, because the black matrix has a function of improving contrast of display and a function of cutting off the rays of light in regions other than a liquid crystal display region, it has been a problem as to how to keep these functions.

SUMMARY OF THE INVENTION

It is therefore an object of the invention to provide a liquid crystal display device without a black matrix while providing the functions of the black matrix.

It is another object of the invention to provide a liquid crystal display device capable of maintaining a thickness of a liquid crystal layer at a suitable level.

The following will briefly illustrate typical examples of the inventions disclosed in this application.

According to a first embodiment of a liquid crystal display device of the present invention, there is provided, for example, a pair of substrates delimiting a pixel region and a peripheral region and a plurality of gate signal lines and a plurality of drain signal lines formed on the pixel regions of one of the pair of substrates and a gap control film formed on at least the one of the pair of substrates and a plurality of color filters formed on the other of the pair of substrates and a plurality of spacers formed on a surface of either one of the pair of substrates. At least two of the plurality of color filters are laminated in the peripheral region and the gap control film is removed at least at portions of the plurality of spacers arranged in the peripheral region.

According to a modification of the first embodiment of the liquid crystal display device of the present invention, for example, in the peripheral region is free of the gap control film over the entirely thereof.

According to another modification of the first embodiment of the liquid crystal display device of the present invention, for example, the plurality of color filters comprise a red color filter, a green color filter and a blue color filter, and each of the plurality of color filters is formed along the plurality of drain signal lines in the pixel regions.

According to a further modification of the first embodiment of the liquid crystal display device of the present invention, for example, two of the plurality of color filters are laminated in the peripheral region. According to a further modification, the two of the plurality of color filter are the red color filter and the blue color filter. According to a further modification of the first embodiment of the liquid crystal display device of the present invention, for example, a thickness of the gap control film is in a range of 50% to 100% of a thickness of a single color filter in the display region.

According to another modification, three of the plurality of color filters are laminated in the peripheral region and the three of the plurality of color filters are the red color filter, the green color filter and the blue color filter. According to a further modification of the first embodiment, for example, a thickness of the gap control film is in a range of 100% to 200% of a thickness of the color filter of a lower layer of the laminated plurality of color filters.

According to another modification of the first embodiment of the liquid crystal display device of the present invention, for example, each of the plurality of color filters in the display region forms a boundary portion with adjacent one of the plurality of color filters having a different color so that opposing side wall surfaces thereof are one of proximate to each other and in contact with each other, the boundary portion being positioned above one of the plurality of drain signal lines. According to a further modification of the first embodiment, for example, the other substrate of the pair of substrates is configured so as to be free of a black matrix thereon. According to a further modification of the first embodiment, for example, the plurality of drain signal lines are made of non-light-transmitting conductive material.

According to another modification of the first embodiment of the liquid crystal display device of the present invention, for example, the plurality of color filters comprise a red color filter, a green color filter and a blue color filter, and each of the plurality of color filters is formed along one of the plurality of gate signal lines and the plurality of drain signal lines in the display region, and each of the plurality of color filters forms a boundary portion with adjacent one of the plurality of color filters having a different color so that opposing side wall surfaces thereof are one of proximate to each other and keep contact with each other and the boundary portion being positioned above one of the plurality of gate signal lines and one of the plurality of the drain signal lines. According to a further modification of the first embodiment, for example, the other substrate of the pair of substrates is configured so as to be free of a black matrix thereon.

According to another modification of the first embodiment of the liquid crystal display device of the present invention, for example, the gap control film comprises a layer made of an organic material.

According to another modification of the first embodiment of the liquid crystal display device of the present invention, for example, the plurality of spacers are formed of resin which is etched by photolithography.

According to another modification of the first embodiment of the liquid crystal display device of the present invention, for example, the plurality of spacer are formed in a plurality of pixel regions on the one of the pair of substrates.

According to another modification of the first embodiment of the liquid crystal display device of the present invention, for example, the plurality of spacers are formed on the plurality of drain signal lines.

According to another modification of the first embodiment of the liquid crystal display device of the present invention, for example, the plurality of spacers are formed on the other substrate of the pair of substrate.

According to another modification of the first embodiment of the liquid crystal display device of the present invention, for example, the gap control film is formed on the display region and the peripheral region, and the peripheral region is free of the gap control film at each portion of the plurality of spacers.

According to another modification of the first embodiment of the liquid crystal display device of the present invention, for example, a protective film made of inorganic material is formed between the gap control film and the plurality of drain signal lines.

According to another modification of the first embodiment of the liquid crystal display device of the present invention, for example, the plurality of spacers are formed on the protective film.

According to another modification of the first embodiment of the liquid crystal display device of the present invention, for example, the gap control film is formed on the one substrate and the other substrate of the pair of substrate. And According to a further modification of the first embodiment, the plurality of spacers are formed on the other substrate of the pair of substrate☐According to a further modification of the first embodiment, the gap control film is a protective film made of an organic material.

According to a second embodiment of the liquid crystal display device of the present invention, for example, a plurality of gate signal lines formed in juxtaposition with one another on a surface of one of a pair of substrates arranged so as to oppose each other through a liquid crystal on the side of said liquid crystal, and a plurality of drain signal lines juxtaposed with one another so as to cross said gate signal lines, said gate signal lines and said drain signal lines together delimiting pixel regions in a display region.

Color filters are formed on a surface of an other of said pair of substrates on the side of said liquid crystal and exhibit a common color to each of said pixel regions juxtaposed with one another along either one of said gate signal lines and said drain signal lines and said color filter forms a boundary portion with an adjacent one of said color filters having a different color so that opposing side wall surfaces thereof are one of proximate and in contact with each other and said boundary portion is positioned above said lines.

At least two layers of said color filters having different colors are formed and laminated in a region other than the display region and a gap control film is formed on both of said gate signal lines and said drain signal lines on a surface of one of said substrates on the side of said liquid crystal and a film thickness of said gap control film at least substantially equal to a film thickness of one of a lower layer of said color filters laminated.

Pole-like spacers are formed on a surface of either one of said substrates on the side of said liquid crystal and said gap control film is removed at portions of said spacers arranged in regions other than said display region.

According to a further embodiment of the second embodiment of the liquid crystal display device of the present invention, for example, said spacers are arranged inside said display region as to avoid said boundary portion of each of said color filters.

The invention is not particularly limited to the constructions described above but can be changed or modified in various ways without departing from the technical concept thereof.

DESCRIPTION OF THE PREFERRED EMBODIMENTS

Liquid crystal display devices according to several preferred embodiments of the invention will be hereinafter explained in detail with reference to the accompanying drawings.

Embodiment 1:

[Overall Construction]

Figure 2A:
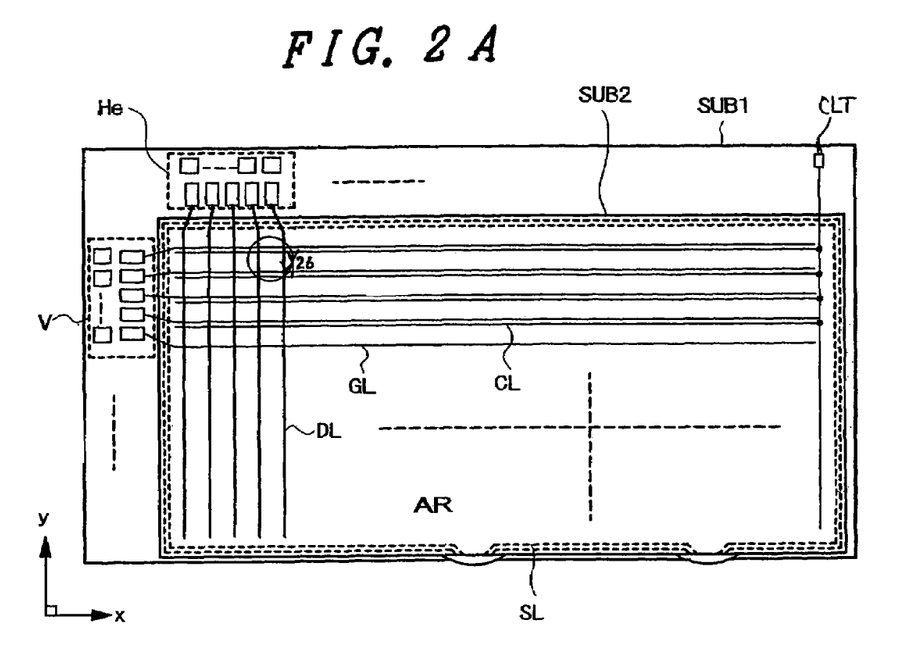
FIG. 2A is a view showing of the liquid crystal display device according to the embodiment of the invention.
Figure 2B:
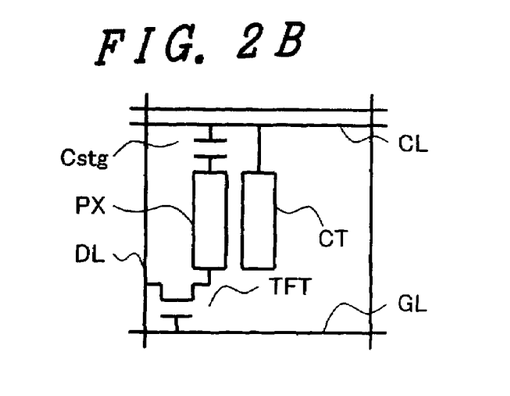
FIG. 2B is an enlarged view of a portion thereof.

FIG. 2A is a structural view of a liquid crystal display device according to an embodiment of the invention and FIG. 2B shows an equivalent circuit which corresponds to an actual geometrical arrangement.

Referring to FIG. 2B, a pair of transparent substrates SUB1 and SUB2 are so arranged as to oppose each other through a liquid crystal. A sealant SL that fixes one of the transparent substrates SUB2 to the other SUB1 also seals the liquid crystal. Gate signals lines GL which extend in an x direction and are juxtaposed with one another in a y direction and drain signal lines DL which extend in the y direction and are juxtaposed with one another in the x direction are formed on a surface of one of the transparent substrates SUB1 on the liquid crystal side that is encompassed by the sealant SL. A region encompassed by each gate signal line GL and each drain signal line DL constitutes a pixel region. An aggregate of these pixel regions in matrix form constitutes a liquid crystal display region AR. A common opposing voltage signal line CL is formed in each of the pixel regions juxtaposed in the x direction in such a manner as to extend inside each pixel region. This opposing voltage signal line CL is a signal line that supplies a voltage as a reference voltage relative to a picture signal to an opposing electrode CT of each pixel region to be later described.

As shown in FIG. 2B, inside each pixel region are formed a thin film transistor TFT operated by a scan signal from the gate signal line GL on one of the sides of the pixel region and a pixel electrode PX to which the picture signal is supplied from a drain signal line DL on one of the sides from the thin film transistor TFT. The pixel electrode PX generates an electric field between the opposing electrode CT connected to the opposing voltage signal line CL and the pixel electrode PX so as to control a transmission factor of the liquid crystal through the electric field.

One of the ends of each gate signal line GL is extended beyond the sealant SL and its extension end constitutes a terminal to which an output terminal of a vertical scanning/driving circuit V is connected. A signal from a printed substrate arranged outside a liquid crystal display panel is inputted to an input terminal of the vertical scanning/driving circuit V. The vertical scanning/driving circuit V includes a plurality of semiconductor devices. A plurality of gate signal lines adjacent to one another is grouped into a group and one semiconductor device is allocated to each group.

Similarly, one of the ends of each drain signal line DL is extended beyond the sealant SL and its extension end constitutes a terminal to which an output terminal of a picture signal driving circuit He is connected. A signal from the printed substrate arranged outside the liquid crystal display panel is inputted to an input terminal of the picture signal driving circuit He. The picture signal driving circuit He also includes a plurality of semiconductor devices. A plurality of drain signal lines adjacent to one another is grouped into a group and one semiconductor device is allocated to each group.

The opposing voltage signal lines CL are connected in common at the end portion on the right side of FIG. 2A, and the connection line is extended beyond the sealant SL and constitutes a terminal CLT at its extension end. A voltage as a reference voltage relative to the picture signal is supplied from this terminal CLT. The scan signal from the vertical scanning circuit V serially selects one of these gate signal lines GL. The picture signal driving circuit He supplies the picture signal to each of the drain signal lines DL in match with the selection timing of the gate signal lines GL.

In the embodiment described above, the vertical scanning/driving circuit V and the picture signal driving circuit He represent the semiconductor device mounted to the transparent substrate SUB1. However, the semiconductor device may be a so-called "tape carrier system semiconductor device" so connected as to bridge the transparent substrate SUB1 and the printed substrate. When the semiconductor layer of the thin film transistor TFT is formed of polycrystalline silicon (p-Si), a semiconductor device formed of poly-Si may be fabricated together with a wiring layer on the surface of the transparent substrate SUB1.

[Pixel Construction]

Figure 3:
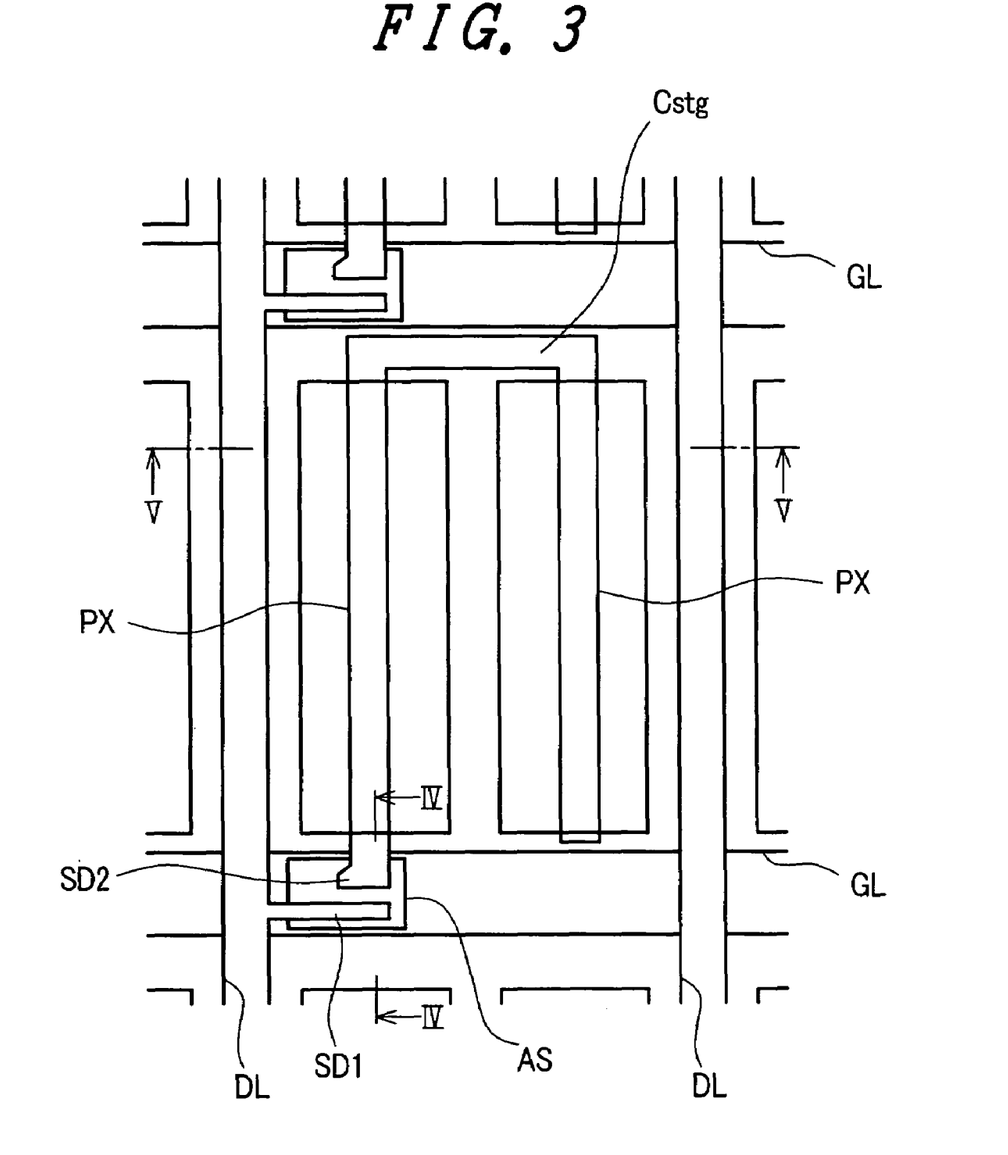
FIG. 3 is a plan view showing pixels of the liquid crystal display device according to the embodiment of the invention.
Figure 4:
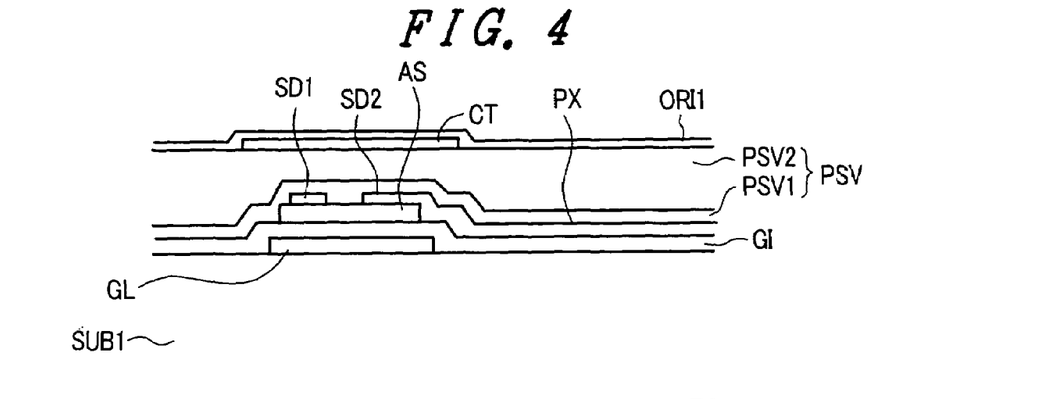
FIG. 4 is a sectional view taken along a line IV—IV in FIG. 3.

FIG. 3 is a plan view that shows an example of an each pixel portion of the pixel region described above. FIG. 4 is a sectional view taken along a line IV—IV in FIG. 3 and FIG. 5 is a sectional view taken along a line V—V in FIG. 3.

In each of these figures, a pair of gate signal lines GL extending in the x direction and juxtaposed with each other in the y direction are formed on the surface of the transparent substrate SUB1 on the liquid crystal side. These gate signal lines GL define a rectangular region in cooperation with a pair of drain signal lines DL to be later described, and this region constitutes a pixel region.

Figure 5:
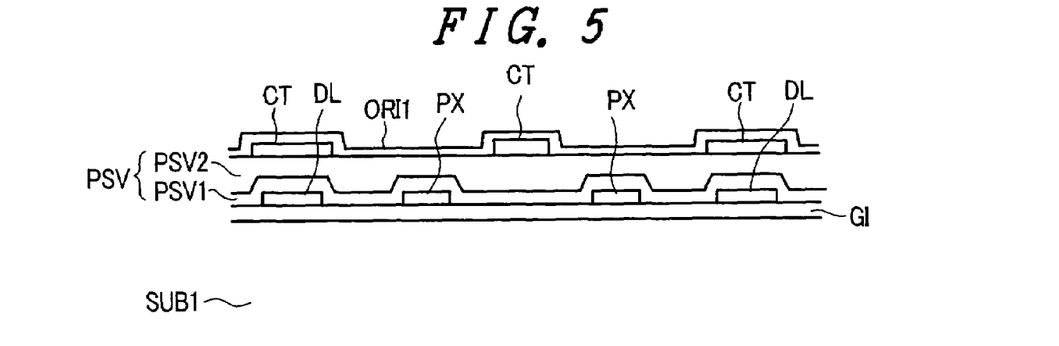
FIG. 5 is a sectional view taken along a line V—V in FIG. 3.

An insulating film GI made of SiN, for example, as shown in FIG. 4 and FIG. 5, is formed on the surface of the transparent substrate SUB1, on which the gate signal lines GL are formed, in such a manner as to cover the gate signal lines GL, too. The insulating film GI has the function of an inter-layer insulating film for the gate signal lines GL in the later-appearing formation region of the drain signal lines DL and the function of the gate insulating film in the formation region of the later-appearing thin film transistors TFT. A semiconductor layer AS made of amorphous Si, for example, is formed on the surface of the insulating film GI in such a manner as to overlap with a part of the gate signal lines GL. The semiconductor layer AS is form part of the thin film transistor TFT. When the drain electrode SD1 and the source electrode SD2 are formed on the upper surface, it becomes possible to constitute an MIS type transistor having a reverse stagger structure using a part of the gate signal line as the gate electrode.

The drain electrode SD1 and the source electrode SD2 are formed simultaneously with the formation of the drain signal line DL. In other words, the drain signal lines DL are formed in such a manner as to extend in the y direction and to be juxtaposed with one another in the x direction, and a part of them is extended up to the upper surface of the semiconductor layer AS, forming the drain electrode SD1. The source electrode SD2 is formed in the spaced-apart relation from the drain electrode SD1 by a distance corresponding to the channel length between the drain electrode SD1 and the thin film transistor TFT. The source electrode SD2 is formed simultaneously with the pixel electrode PX to be formed inside the pixel region.

In other words, the pixel electrodes PX have a plurality (two, in FIG. 3) of electrode groups extending in the y direction inside the pixel region and juxtaposed with one another in the x direction. One of the ends of one of the pixel electrodes PX serves also as the source electrode SD2 described above and the other end can be electrically connected to the corresponding position of the other pixel electrode PX.

A thin film doped with an impurity in a high concentration is formed on the interface of the semiconductor layer AS, the drain electrode SD1 and the source electrode SD2, and functions as a contact layer. A high concentration impurity layer has already been formed on the surface of the contact layer when the semiconductor layer AS is formed, for example. The contact layer can be formed when the exposed impurity layer is etched away by use of a pattern of the drain electrode SD1 and the source electrode SD2 formed on its upper surface as a mask.

A protective film PSV is formed on the surface of the transparent substrate SUB1 on which the thin film transistor TFT, the drain signal line DL, the drain electrode SD1, the source electrode SD2 and the pixel electrode PX are formed in the manner described above. This protective film PSV prevents the direct contact of the thin film transistor TFT with the liquid crystal and deterioration of characteristics of the thin film transistor TFT. The protective film PSV has a two-layered structure of a protective film PSV1 made of an inorganic material such as SiN and a protective film PSV2 comprising an organic material layer such as a resin. The protective film PSV includes at least the organic material layer to reduce the dielectric constant of the protective film itself. The protective film PSV2 is so constituted as to function as a so-called "gap control film" for controlling the film thickness of the liquid crystal layer in this embodiment. This gap control film will be explained elsewhere in further detail.

The opposing electrode CT is formed on the upper surface of the protective film PSV2. The opposing electrode CT includes a plurality (three, in the drawing) of electrode groups extending in the y direction and juxtaposed with one another in the x direction in the same way as the pixel electrodes PX. These electrodes are so positioned as to sandwich the pixel electrode PX between them when viewed plane-wise. In other words, the opposing electrodes CT and the pixel electrodes PX are equidistantly arranged in the sequence of the opposing electrode, the pixel electrode, the opposing electrode, the pixel electrode, and so forth, from the drain signal line on one of the sides to the drain signal line on the other side. The opposing electrodes CT positioned on both sides of the pixel region are formed in such a manner that a part thereof overlaps with the drain signal line DL and is in common with a part of the corresponding opposing electrode CT of the adjacent pixel region.

In other words, the opposing electrodes CT are formed on the drain signal lines DL in such a manner that their center axes are substantially coincident and the width of each opposing electrode CT is greater than that of the drain signal line DL. Each opposing electrode CT on the left side of the drain signal line DL constitutes one of the opposing electrodes CT of the pixel region on the left side, and each opposing electrode CT on the right side constitutes one of the opposing electrodes CT of the pixel region on the right side. Since the opposing electrode CT having a width greater than that of the drain signal line DL is formed above the drain signal line DL as described above, it is possible to acquire the effect of preventing the line of electric force from the drain signal line DL from terminating at the opposing electrode and hence, at the pixel electrode PX. If the line of electric force from the drain signal line DL terminates at the pixel electrode PX, it results in noise.

Each opposing electrode including the electrode groups is formed integrally with the opposing voltage signal line CL that is made of the same material and is so formed as to sufficiently cover the gate signal line GL. The reference voltage is supplied through this opposing voltage signal line CL. The opposing electrode CT and the opposing voltage signal line CL may be formed of a metal but in this embodiment, they are formed of an optically transparent oxide such as ITO (Indium Tin Oxide), ITZO (Indium Tin Zinc Oxide), IZO (Indium Zinc Oxide) or $SnO_2$ from the aspect of the improvement in the aperture ratio.

The connection portion of each pixel electrode PX is positioned below the opposing voltage signal line CL at the swell portion of this gate signal line GL so formed as to sufficiently cover the gate signal line GL. Consequently, a capacitance device Cstg using the protective film PSV as a dielectric film is formed between the pixel electrode PX and the opposing voltage signal line CL. This capacitance device Cstg has the function of storing the picture signal supplied to the pixel electrode PX for a relatively longer period of time, for example.

An orientation film ORI1 is formed over the upper surface of the transparent substrate SUB1 having the opposing electrodes CT formed thereon in such a manner as to cover the opposing electrodes CT, too. The orientation film ORI1 is the one that comes into direct contact with the liquid crystal, and rubbing applied to its surface determines the initial orientation direction of the liquid crystal molecules.

[Color Filter]

Figure 1:
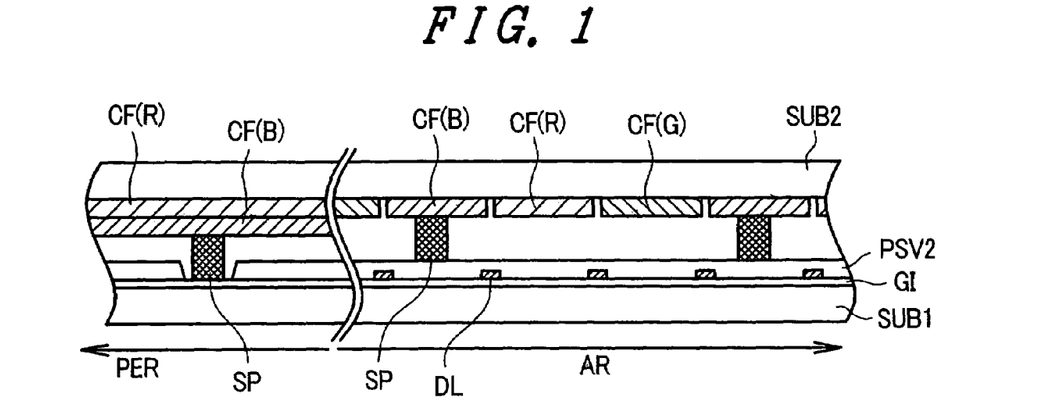
FIG. 1 is a sectional view showing a liquid crystal display device according to one embodiment of the invention.

FIG. 1 is a sectional view of the transparent substrate SUB1 when it is cut in the x direction and shows the AR region and also the peripheral region PER. FIG. 1 also shows the transparent substrate SUB2 that is so arranged as to oppose the transparent substrate SUB1 through the liquid crystal. Only the insulating film GI, the drain signal line DL and the protective film PSV2 (gap control film) are shown in the surface of the transparent substrate SUB1 on the liquid crystal side to simplify illustration.

A color filter CF is formed on the surface of the transparent substrate SUB2 on the liquid crystal side. This color filter CF includes color filters of red (R), green (G) and blue (B). The color filters CF are juxtaposed in the y direction (along the drain signal line DL) and in common with each pixel region. They are arranged in the sequence of B, R, G, B, and so forth, from the left side to the right in the figure, for example.

In this case, the color filters CF adjacent to one another in the AR region and having mutually different colors are formed in such a manner that they do not overlap with one another. In other words, the mutually opposing sidewalls of each color filter CF are formed in the proximity of one another, or in such a manner as to be in, contact with each other (not shown in FIG. 1). Since each color filter CF does not have the mutually overlapping portion, the surface of each color filter CF can be shaped into a planar surface not having any concavo-convexity. Planarity of each color filter CF makes it possible to make the thickness of the liquid crystal layer uniform. The boundary of each adjacent color filer CF is positioned above the drain signal line DL, and the drain signal line DL has the function of a black matrix in cooperation with the gate signal line GL. From this aspect, both drain signal line DL and gate signal line GL are preferably formed of a metal that completely cuts off the rays of light. The color filter CF has the construction described above at the portion at which the substantial liquid crystal display region AR is formed.

In the peripheral region PER, as shown in FIG. 1, the color filter CF comprises a laminate structure of the red (R) color filter CF and the blue (B) color filter CF. The color filter CF having such a laminate structure has the function as a shading film and can prevent the rays of light from a back-light, for example, from passing through the color filter CF and leaking to an observer. For this reason, the color filter CF is not particularly limited to the laminate structure of the red (R) color filter CF and the blue (B) color filter CF, but may be a laminate structure of arbitrary two color filters CF of red (R), green (G) and blue (B) that may form the shading film. However, the laminate structure of the red (R) color filter CF and the blue (B) color filter CF can absorb much more the green wavelength having high visual sensitivity of people and can improve much more the degree of visual shading performance than the laminate structures of other combinations.

To secure the gap of one of the transparent substrates SUB1 to the other SUB2, pole-like spacers SP are formed. The pole-like spacer SP is formed by the steps of forming a resin layer, for example, on the surface of one of the transparent substrates on the liquid crystal side and selectively etching away the resin layer by photolithography. Therefore, the spacer having a predetermined height can be formed at a desired position.

In this embodiment, the pole-like spacer SP is formed inside a selected region of the pixel region that serves as a substantial liquid crystal display region AR. Though the drop of the aperture ratio can be avoided when the spacer SP is so formed as to overlap with the drain signal line DL, it is formed at the portion described above where the spacer SP can be reliably formed because the position overlapping with the drain signal line DL is the boundary of the adjacent color filters having different colors.

The pole-like spacer SP in other regions encompassing the substantial liquid crystal display region is arranged at the portion where a hole of the protective film PSV2 as the gap control film formed on the side of the transparent substrate SUB1 is formed. In other words, the pole-like spacer SP formed at this portion corresponds to the portion on the side of the transparent substrate SUB2 where the color filter CF is formed in the two layers. The hole formed in the protective film PSV2 plays the role of conducting the necessary adjustment of the height of the pole-like spacer SP. For this reason, the film thickness of the protective film PSV2 is preferably substantially equal to the film thickness of a single color filter CF in the display region AR, although the thickness of the protective film PSV2 may vary in a range of 50% to 150% of the thickness of color filter CF.

A phenomenon in which the film thickness of an upper layer of the laminate of the color filter CF as formed on the substrate in the peripheral region becomes somewhat smaller than a thickness of a lower layer sometimes occurs. When this phenomenon is taken into consideration, the film thickness of the protective film PSV2 is preferably set to the range of 50% to 100% of film thickness of a single color filter in the display region.

When the film thickness of the red (R) color filter CF is about 0.9 $\mu$m in the construction shown in FIG. 1, the film thickness of the protective film PSV2 is preferably 0.7 $\mu$m. The liquid crystal display device having such a construction has the black matrix function though it is not equipped with the black matrix. Therefore, the aperture ratio of the pixels can be improved.

In this embodiment, the protective film PSV2 formed on the side of the transparent substrate SUB1 serves as the gap control film. Needless to say, a film formed separately from the protective film PSV2 may be used as the gap control film.

Figure 6:
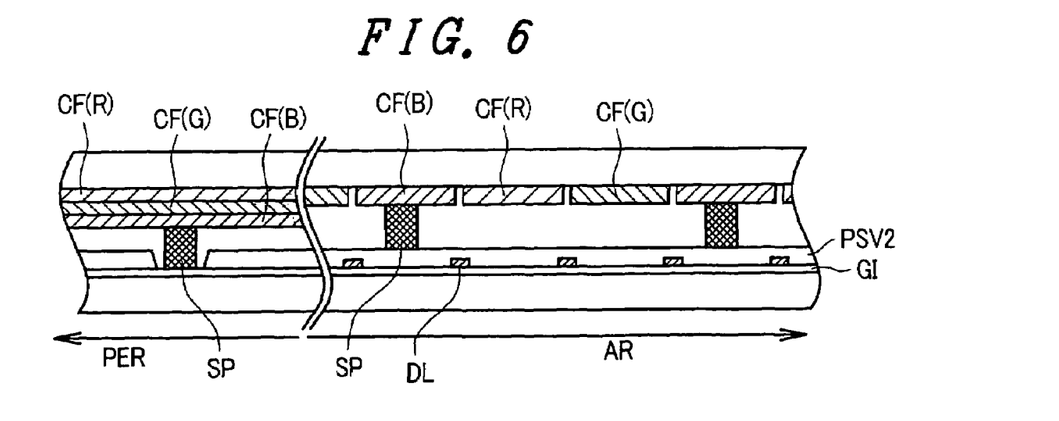
FIG. 6 is a sectional view showing a liquid crystal display device according to another embodiment of the invention.

Embodiment 2:

FIG. 6 is a sectional view that shows a liquid crystal display device according to another embodiment of the invention and corresponds to FIG. 1.

The difference of this construction from FIG. 1 is that each color filter CF of R, G and B in the PER region is constituted into a three-layered structure to form the shading portion. Consequently, the thickness of the gap control film (protective film PSV2) becomes greater than the thickness of the color filter CF which is further laminated on a lower layer. In other words, the film thickness of the gap control film is substantially equal to the balance obtained by subtracting the thickness of the color filter of the lowest layer of the laminate from the thickness of the sum of the color filters so laminated. In this case, the film thickness is of course set while the phenomenon described in Embodiment 1 is taken into account. When this phenomenon is taken into consideration, the film thickness of the protective film PSV2 is preferably set to a range of 100% to 200% up the film thickness of the lower layer color filter CF of the laminate in the peripheral region.

Figure 7:
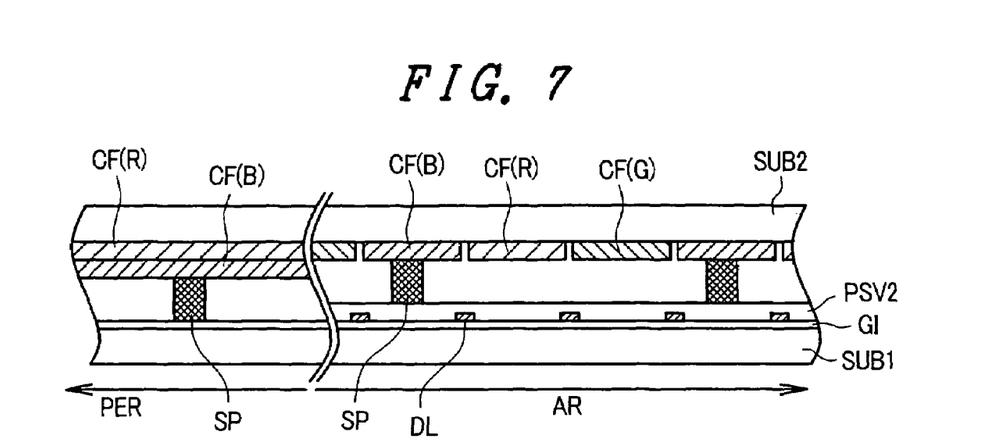
FIG. 7 is a sectional view showing a liquid crystal display device according to a further embodiment of the invention.

Embodiment 3:

FIG. 7 is a sectional view that shows a liquid crystal display device according to a further embodiment of the invention and corresponds to FIG. 1.

The difference of this construction from FIG. 1 is that the gap control film (protective film PSV2) is not formed in other regions such as the PER region encompassing the liquid crystal display region AR.

In the case of FIG. 1, the hole is bored in the gap control film and the pole-like spacer is positioned at this hole. In the case of FIG. 7, the hole is formed into a greater diameter as its final form.

Figure 8:
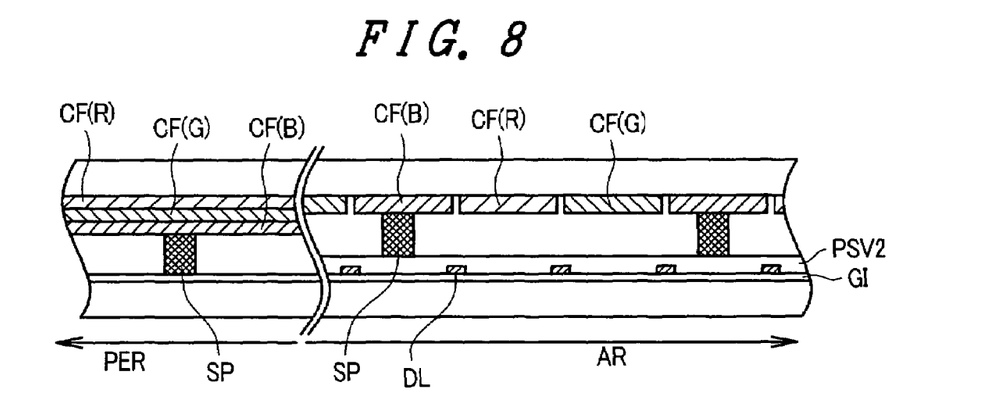
FIG. 8 is a sectional view showing a liquid crystal display device according to another embodiment of the invention.

Embodiment 4:

FIG. 8 is a sectional view that shows a liquid crystal display device according to still another embodiment of the invention and corresponds to FIG. 6 and FIG. 7.

In this case, as in FIG. 7, the gap control film (protective film PSV2) is not formed in other regions such as PER encompassing the substantial liquid crystal display region AR and the entire three layer laminate color filter is provided in the PER region as in FIG. 6.

Figure 9:
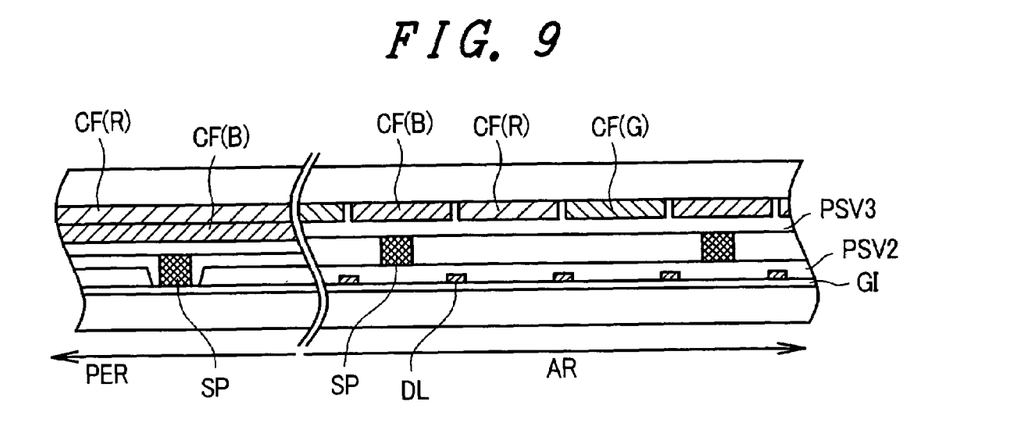
FIG. 9 is a sectional view showing a liquid crystal display device according to another embodiment of the invention.

Embodiment 5:

FIG. 9 is a sectional view that shows a liquid crystal display device according to another embodiment of the invention and corresponds to FIG. 1.

The difference of this construction from FIG. 1 is that a protective film PSV3 is so formed as to cover each color filter CF on the side of the transparent substrate SUB2. This protective film PSV3 prevents peeling of the color filter CF from the transparent substrate SUB2 and improves reliability of the color filter CF. When the protective film PSV3 is formed of a resin, its surface can be more planarized and the thickness of the liquid crystal layer can be made more uniform. Thus, the protective film PSV3 serves as a gap control film, and it is possible to remove the protective film PSV3 and form pole-like spacers at the removed portion.

Figure 10:
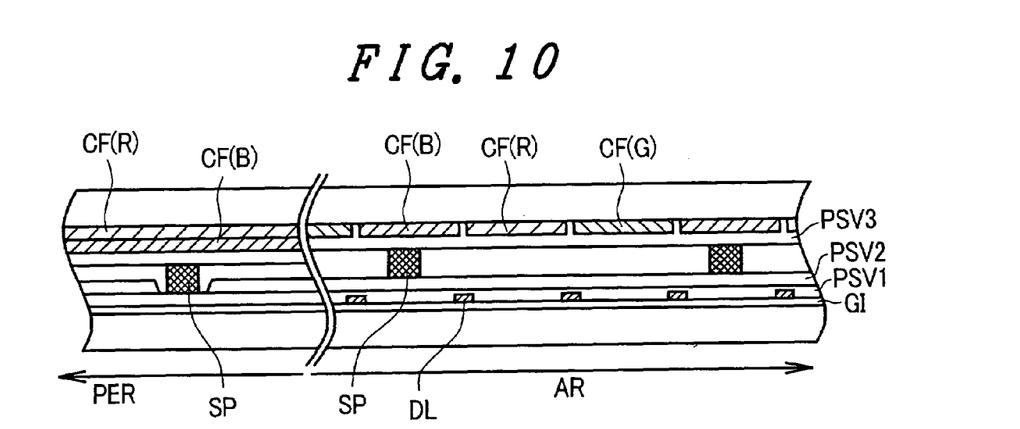
FIG. 10 is a sectional view showing a liquid crystal display device according to a further embodiment of the invention.

Embodiment 6:

FIG. 10 is a sectional view that shows a liquid crystal display device according to another embodiment of the invention and corresponds to FIG. 9.

The difference of this construction from FIG. 9 is that a wiring protective film is formed as a lower layer of the gap control film. This wiring protective film corresponds to the protective film PSV1 in the constructions shown in FIGS. 4 and 5. The pole-like spacers can be arranged at arbitrary positions even when the wiring exists in other regions encompassing the substantial liquid crystal display region. That is, the wiring is protected by the wiring protective film and is not affected by the pole-like spacers. From this aspect, the protective film PSV1 is preferably formed of an inorganic material such as SiN since it is excellent in moisture resistance and can sufficiently protect the wiring layer.

Embodiment 7:

In each of the foregoing embodiments, the opposing electrode CT and the pixel electrode PX are formed at the mutually different layers through the protective films PSV1 and PSV2. However, the opposing electrode CT and the pixel electrode PX may, of course, be formed in the mutually different layers through the protective film PSV2 or at the same layer on the protective film PSV.

Embodiment 8:

The liquid crystal display devices of the foregoing embodiments are of a so-called "in-plane switching (IPS) type" in which the electric field component parallel to the transparent substrate SUB1 drives the liquid crystal. However, the invention can of course be applied to a liquid crystal display device of a vertical field type.

Figure 11:
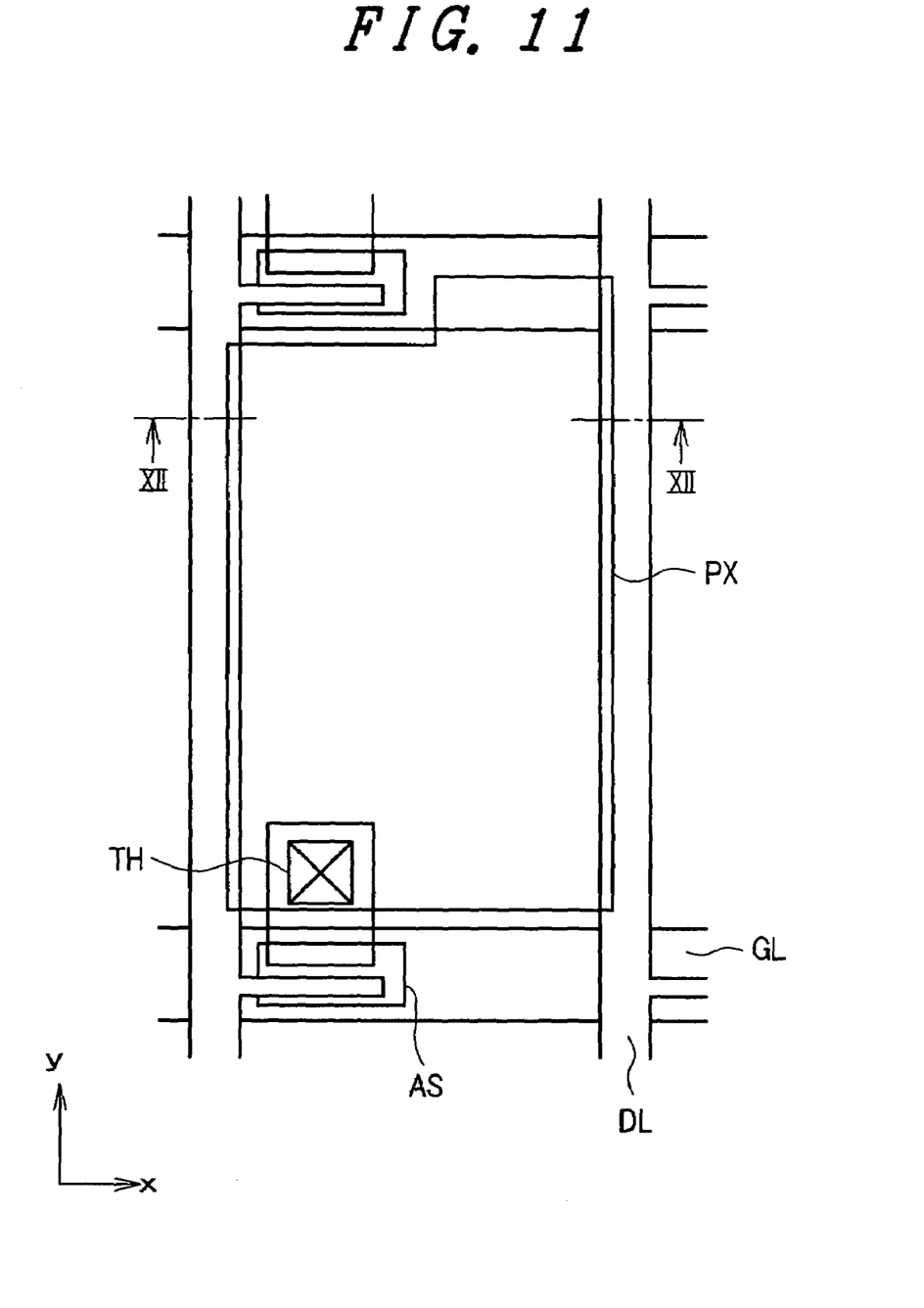
FIG. 11 is a plan view showing a liquid crystal display device according to another embodiment of the invention.
Figure 12:
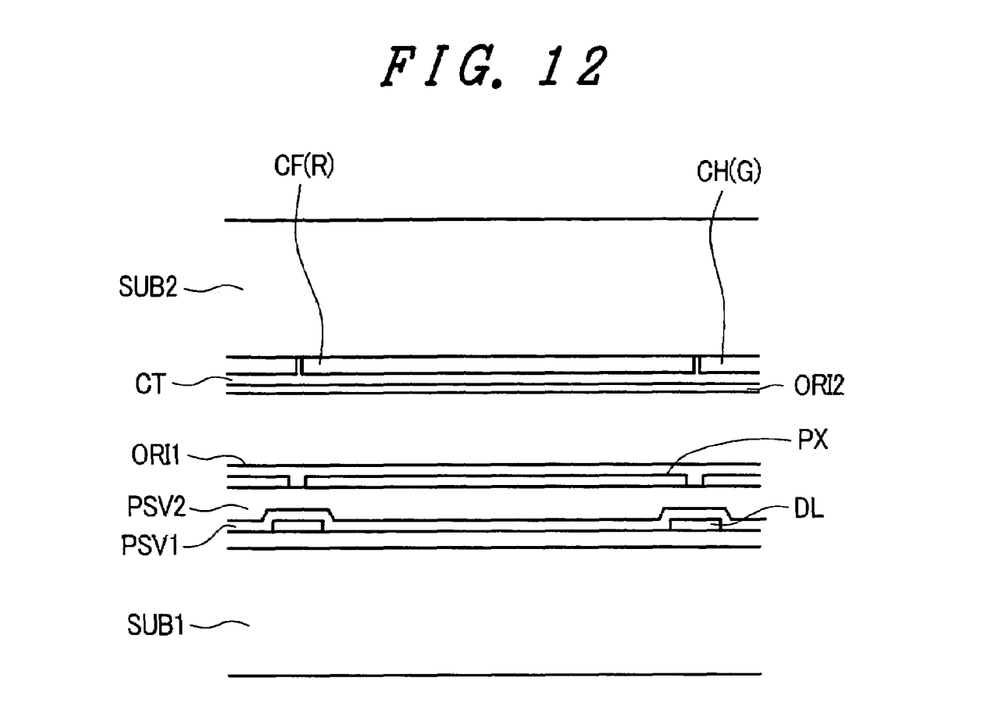
FIG. 12 is a sectional view taken along a line XII—XII in FIG. 11.

FIG. 11 is a plan view that shows an example of pixels of a liquid crystal display device of the vertical field type, and corresponds to FIG. 3. FIG. 12 is a sectional view taken along a line XII—XII in FIG. 11.

The construction of this embodiment is different from the construction shown in FIG. 3 in the following points. A pixel electrode PX formed of a light-shading electrically conductive film such as ITO is formed on the upper surface of the protective film PSV2 on the side of the transparent substrate SUB1 in such a fashion as to cover a major proportion of the pixel region, and the opposing electrode CT common to each pixel region is formed of a light-shading electrically conductive film such as ITO on the upper surface of each color filter CF on the side of the transparent substrate SUB2. The pixel electrode PX is connected to the source electrode SD1 of the thin film transistor TFT through a through-hole TH that penetrates through the protective films PSV2 and PSV1. In this case, the black matrix is also not formed, and the protective film PSV2 functions as the gap control film.

The side of the pixel electrode PX parallel to the drain signal line DL is formed in this case so as to overlap the drain signal line DL such that the aperture ratio of the pixel can be improved.

Figure 13:
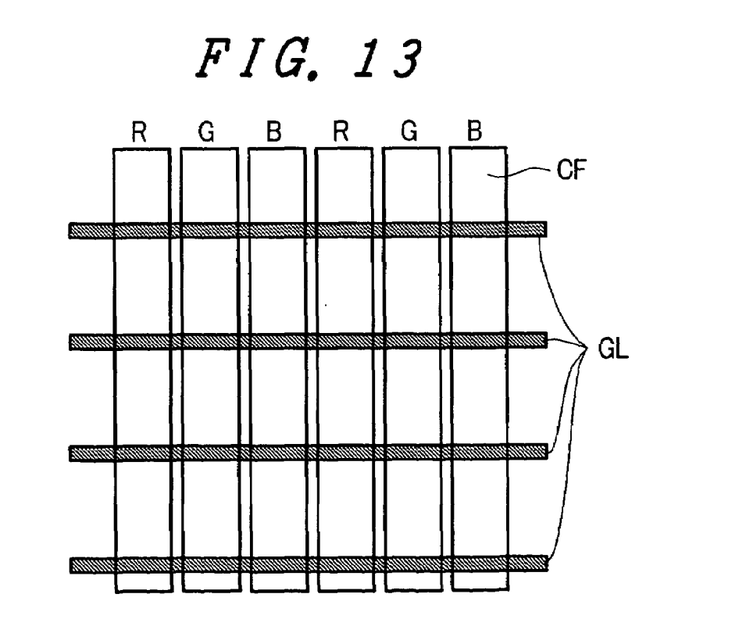
FIG. 13 is an explanatory view showing a liquid crystal display device according to another embodiment of the invention.

Embodiment 9:

FIG. 13 shows a positional relation of each color filter CF with the gate signal line GL. As shown, each color filter CF is continuously formed while crossing the gate signal line GL. This structure can prevent the occurrence of unnecessary steps and hence, the occurrence of domains, and can secure higher planarity for positioning the pole-like spacers SP.

Figure 14:
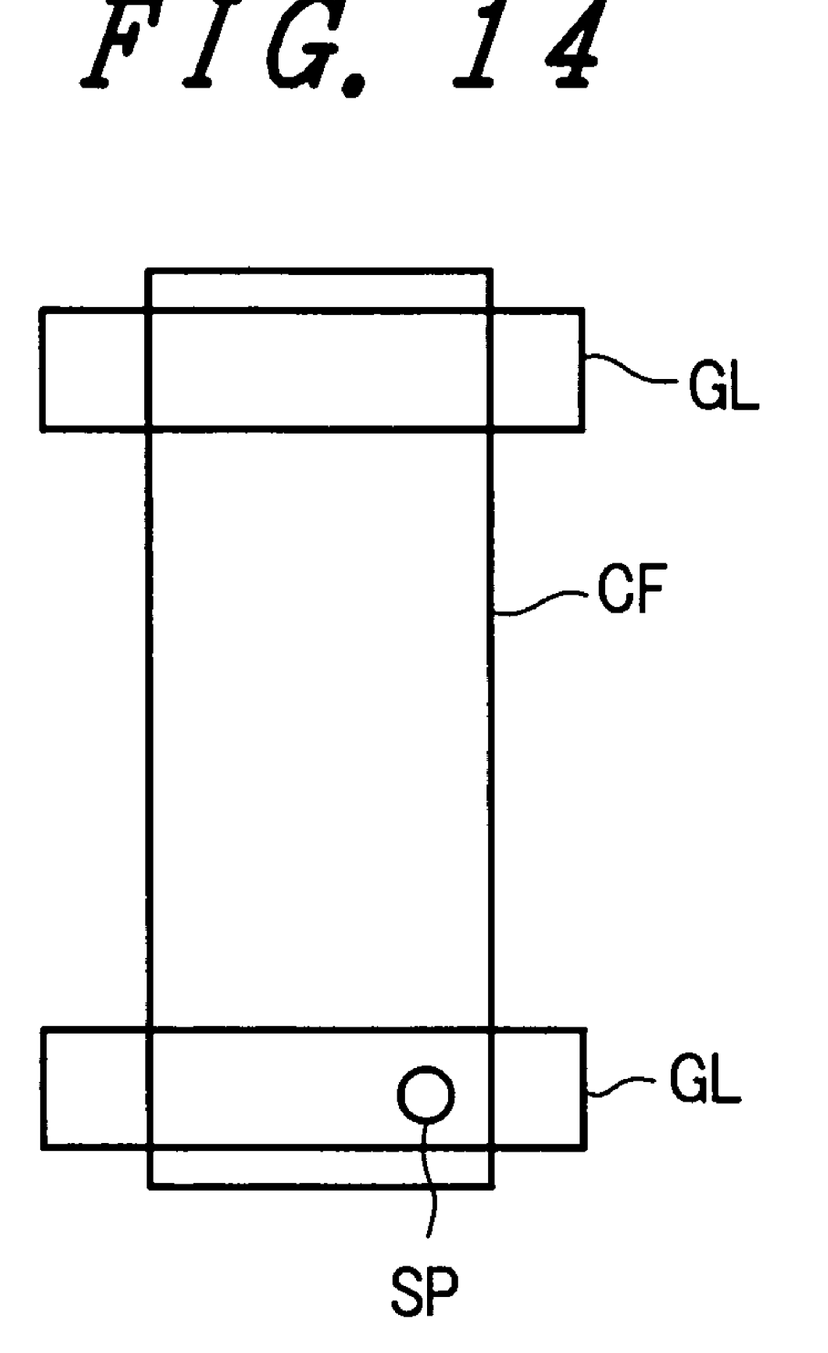
FIG. 14 is an explanatory view showing a liquid crystal display device according to a further embodiment of the invention.

Embodiment 10:

FIG. 14 shows an arrangement of the pole-like spacers SP inside the pixel region. As shown, the spacers SP are formed in such a fashion as to overlap with the gate signal line GL. Consequently, the gate signal line GL can cut off light to the spacers SP. Because the spacers SP can be positioned so as to oppose the planar color filter CF, gap uniformity inside the liquid crystal display region AR can be improved.

The insulating film GI described in the specification and shown in the drawings may be a laminate layer of a gate insulating film and an inter-layer insulating film or a mere inter-layer insulating film besides the gate insulating film.

As is apparent from the explanation given above, the liquid crystal display device according to the invention can achieve a construction without a black matrix while maintaining the black matrix function. Further it is possible to form a plurality of spacers on the color filters of the other substrate of the pair of substrates.

What is claimed is:

1. A color display device comprising:
    a pair of substrates having a display portion and a peripheral portion;
    a plurality of gate signal lines and a plurality of drain signal lines formed on one substrate of the pair of substrates;
    a protective film formed on the plurality of gate signal lines, the plurality of drain signal lines, and the one substrate of the pair of substrates including at least one of the peripheral portion and the display portion thereof;
    a plurality of color filters formed on the other substrate of the pair of substrates; and
    a plurality of spacers formed on the one substrate of the pair of substrates including the peripheral portion thereof,
    wherein at least two of the plurality of color filters are laminated in the peripheral portion; and
    wherein a thickness of the protective film in the display portion is greater than a thickness of the protective film at a position of one of the plurality of spacers arranged in the peripheral portion.

2. A color display device according to claim 1, wherein the peripheral portion is free of the protective film over the entirety thereof.

3. A color display device according to claim 1, wherein the at least two of the plurality of color filters laminated in the peripheral portion are a red color filter and a blue color filter.

4. A color display device according to claim 1, wherein the at least two of the plurality of color filters laminated in the peripheral portion are a red color filter, a blue color filter and a green color filter.

5. A color display device according to claim 1, wherein the protective film comprises at least an organic material layer.

6. A color display device according to claim 5, wherein the protective film comprises the organic material layer and an inorganic material layer.

7. A color display device according to claim 1, wherein the plurality of spacers are formed of resin which is etched by photolithography.

8. A color display device according to claim 1, wherein the plurality of spacers are formed on the plurality of drain signal lines.

9. A color display device comprising:
    a pair of substrates having a display portion and a peripheral portion;
    a plurality of gate signal lines and a plurality of drain signal lines formed on one substrate of the pair of substrates;
    a protective film formed on the plurality of gate signal lines, the plurality of drain signal lines, and the one substrate of the pair of substrates including at least one of the peripheral portion and the display portion thereof;
    a light block film formed on the other substrate of the pair of substrates in the peripheral portion; and
    a plurality of spacers formed on the one substrate of the pair of substrates in the display portion and the peripheral portion; and
    wherein a thickness of the protective film in the display portion is greater than a thickness of the protective film at a position of one of the plurality of spacers arranged in the peripheral portion.

10. A color display device according to claim 9, wherein the peripheral portion is free of the protective film over the entirety thereof.

11. A color display device according to claim 9, wherein the plurality of spacers are formed of resin which is etched by photolithography.

12. A color display device according to claim 9, wherein the plurality of spacers are formed on the plurality of drain signal lines.

13. A color display device according to claim 9, wherein the plurality of spacers are a plurality of pole-like spacers.

14. A color display device according to claim 9, wherein the light block film comprises a red color filter and a blue color filter.

15. A color display device according to claim 9, wherein the light block film comprises a red color filter, a blue color filter and a green color filter.

16. A color display device according to claim 9, wherein the protective film comprises at least an organic material layer.

17. A color display device according to claim 16, wherein the protective film comprises the organic material layer and an inorganic material layer.

* * * * *